United States Patent [19]

Winchell

[11] 4,087,108
[45] May 2, 1978

[54] CAMBERING VEHICLE WITH TRAILING ARMS INTERCONNECTED BY SPUR GEARING

[75] Inventor: Frank J. Winchell, Orchard Lake, Mich.

[73] Assignee: General Motors Corporation, Detroit, Mich.

[21] Appl. No.: 727,588

[22] Filed: Sep. 28, 1976

[51] Int. Cl.² .............................................. B62M 1/00
[52] U.S. Cl. ................................ 280/221; 180/25 A; 180/26 R; 280/278; 280/282; 280/287
[58] Field of Search .............. 280/87 R, 87 B, 112 R, 280/112 A, 278, 287, 6 R, 6 H, 6.1, 6.11, 200, 210, 218, 220, 221, 224, 21 R, 21 A, 12.1, 12 H, 282; 180/25 R, 26 R, 41, 25 A

[56] References Cited

U.S. PATENT DOCUMENTS

| | | | |
|---|---|---|---|
| 487,753 | 12/1892 | Koenig | 280/6 X |
| 2,593,974 | 4/1952 | Brown | 280/21 |
| 2,696,387 | 12/1954 | Nordin | 280/263 |
| 2,887,322 | 5/1959 | DeMonge | 280/104 |
| 3,277,840 | 10/1966 | Li | 105/145 |
| 3,354,976 | 11/1967 | Camps | 280/287 |
| 3,964,563 | 6/1976 | Allen | 180/41 |

FOREIGN PATENT DOCUMENTS

| | | | |
|---|---|---|---|
| 49-42586 | 11/1974 | Japan | 280/87 R |

*Primary Examiner*—Joseph F. Peters, Jr.
*Assistant Examiner*—Terrance L. Siemens
*Attorney, Agent, or Firm*—Charles R. White

[57] ABSTRACT

A three-place contact cambering vehicle having a pair of trailing arms pivoted to a front frame for up and down swinging movement on either side of the frame and interconnected by spur gearing that stabilizes and holds the frame and connected steering column at a predetermined rake angle while permitting equal and opposite movement of the trailing arms. This gearing can be locked to lock the trailing arms and frame together for vehicle parking purposes. An adjustment is provided to permit the rake angle of the frame to be selectively varied to change steering column rake angle and to further permit the frame and steering column to be collapsed toward the trailing arms and subsequently locked to provide a compact, low profile vehicle for transportation or storage purposes.

4 Claims, 6 Drawing Figures

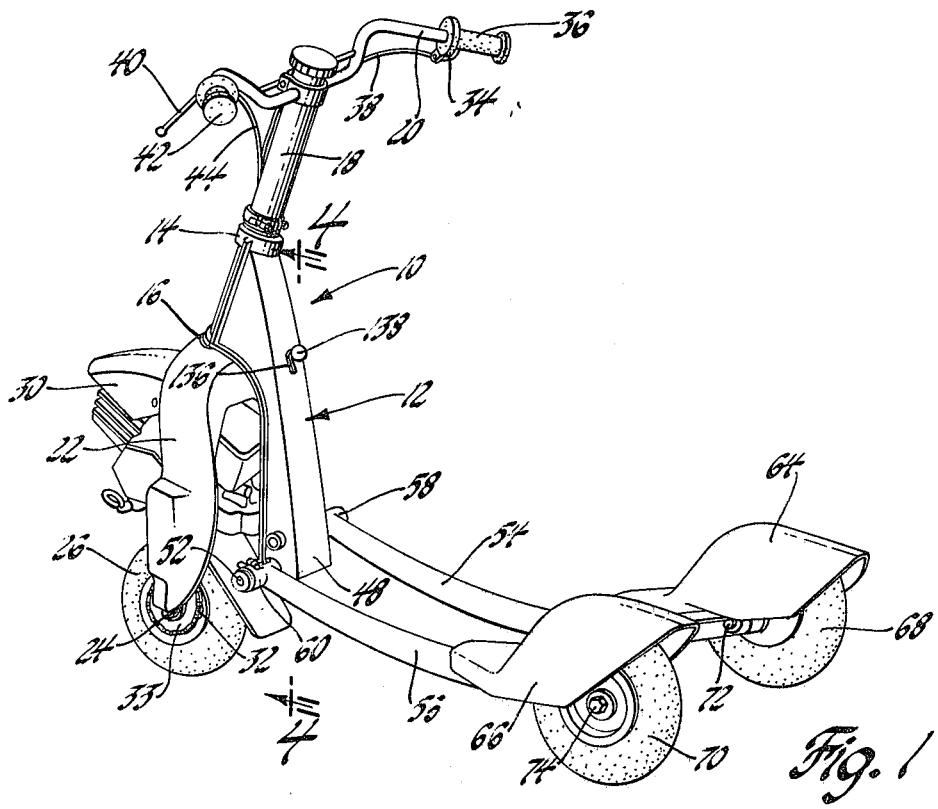
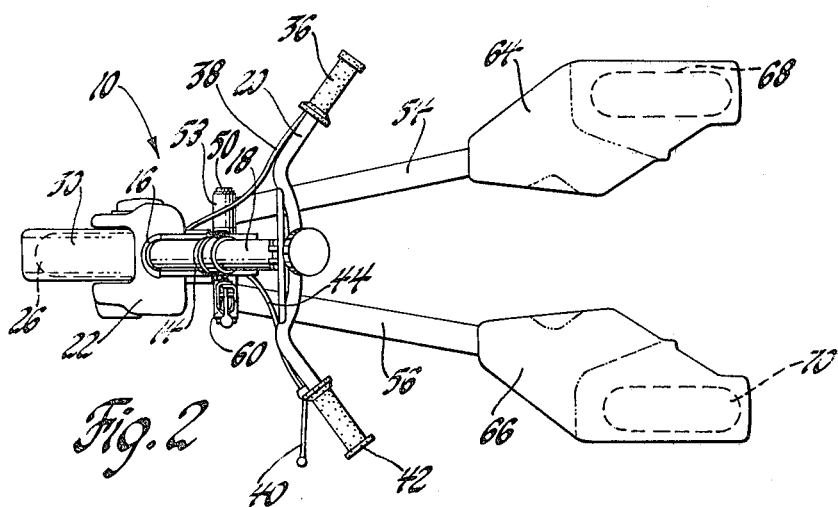
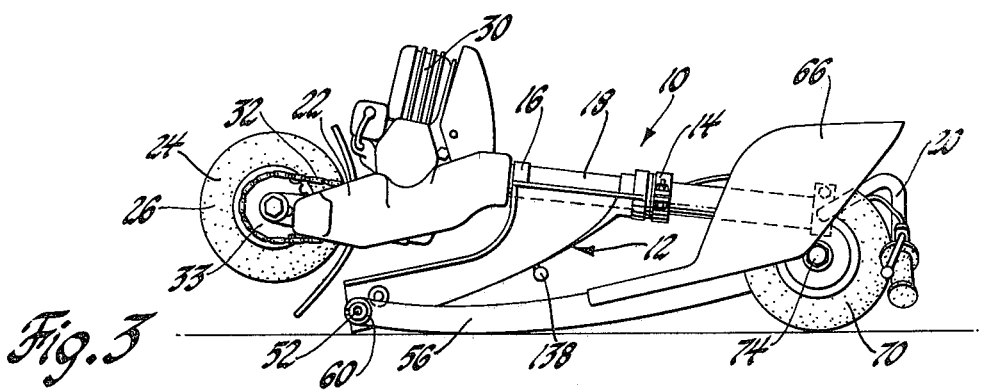

CAMBERING VEHICLE WITH TRAILING ARMS INTERCONNECTED BY SPUR GEARING

This invention relates to vehicles and more particularly to a new and improved light weight cambering vehicle having a stabilizer and equalizer provided by spur gearing interconnecting a pair of trailing arms with a front frame and steering column assembly for improved vehicle operation, vehicle parking, stowage and rake angle adjustment.

In the preferred embodiment of this invention there is a new and improved gearing arrangement drivingly interconnecting the pivoted trailing arms of a three-place contact cambering vehicle which, in the operational position, has an upstanding front steering frame assembly. The gearing comprises a pair of spur gears carried by the trailing arms which intermesh so that swinging movement of one of the arms in one direction will cause the equal and opposite swinging movement of the other of the arms in an opposite direction. While providing for the equal and opposite swinging movement of the trailing arms, the gearing importantly provides a mechanism to fix and stabilize the angle of the steering column with respect to a roadway or other vehicle support surface. To this end, there is a centralized front or main frame connected at an upper end portion to the steering column to provide a front steering frame assembly. The lower end portion of the front frame supports left and right pivot shafts that respectively pivotally connect the two trailing arms to the front frame at their forward ends. One of the spur gears can be selectively disengaged from the driving engagement with its associated pivot shaft so that the rake angle of the front steering column can be changed. Subsequently, this spur gear is again drivingly connected to the pivot shaft to maintain the steering column in the adjusted position. In addition the invention has means for preventing rotation of the spur gears so that they cannot be turned and the trailing arms are held in any selected relative angular position to provide for improved vehicle parking. If desired, the vehicle can be parked on an incline with the trailing arms locked at an appropriate relative angular position to match the slope of the incline. The invention provides for an improved stowage of the vehicle since the front steering column can be moved to a folded position adjacent to the trailing arms and locked in a low profile position. The vehicle of this invention is a light weight, narrow track cambering vehicle of articulated frame members which can be adjusted to provide improved vehicle operation and operator comfort.

These and other objects, advantages and features of the invention will become more apparent from the following detailed description and drawings in which:

FIG. 1 is a perspective view of a preferred embodiment of the cambering vehicle of this invention.

FIG. 2 is a top plan view of the vehicle of FIG. 1.

FIG. 3 is a side elevational view of the vehicle of FIG. 1, but illustrating the vehicle in a folded position.

Figure 4:
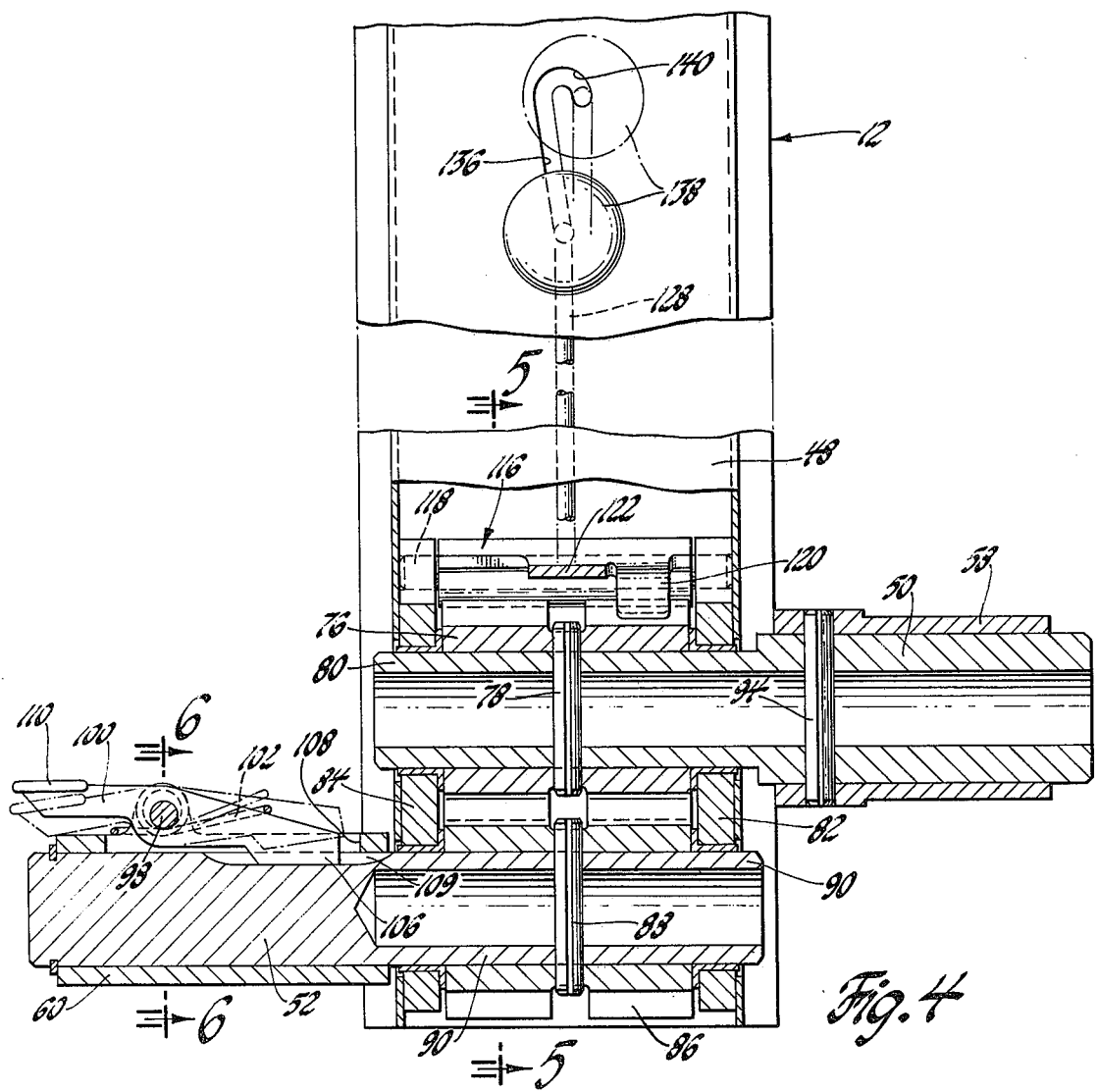
FIG. 4 is a view partly in section taken along line 4—4 of FIG. 1.

Turning now in greater detail to the drawing, the cambering vehicle 10 shown in FIG. 1 has a steering assembly comprising a front main frame 12 which has at its upper end a pair of spaced collars 14 and 16 that rotatably support a tubular steering column 18. The upper end of the steering column 18 is provided with a handle bar assembly 20 fixed thereto while the lower end carries a fork 22 that supports front axle 24 and the rotatable front wheel 26. The front fork further supports an internal combustion engine 30 that drives the front wheel 26 through a drive chain 32 and a sprocket 33. Engine operation is controlled by manually operated controls mounted on the handle bar assembly 20. Engine speed is adjusted by rotatable throttle control 34 adjacent to the inboard end of the right hand handle bar grip 36. This throttle control is operatively connected to the engine throttle by cable means 38 and is manually adjusted by the vehicle operator to set the engine at selected throttle openings from idle to wide open throttle. Lever 40, mounted on the handle bar assembly adjacent to the left hand handle bar grip 42, is operatively connected to the engine by cable 44 and is actuated by the operator to override a one way clutch (not illustrated) for vehicle starting purposes.

The main frame 12 is an elongated member that extends rearwardly and downwardly from the steering column collars 14 and 16 and terminates in an end portion forming a journal box 48 for the right and left pivot shafts 50 and 52 which extend laterally therefrom. The vehicle has right and left side trailing arms 54 and 56 formed with front hubs 58 and 60 that are respectively mounted on and secured to pivot shafts 50 and 52. The trailing arms extend rearwardly from the main frame 12 and have right and left combination foot pads and wheel fenders 64 and 66 which are mounted on suitable pivots and support brackets for operator initiated fore and aft rocking movements. When the operator stands on and rocks the foot pads forwardly, his body weight is naturally displaced forwardly so that the front drive wheel 26 is impressed with increased loading for improved drive wheel traction. By physically rocking rearwardly on the foot pads, friction pad means internally of the wheel fenders frictionally engage the right and left rear wheels 68 and 70 for vehicle braking purposes.

These rear wheels are rotatably mounted on axles 72 and 74 which are supported by suitable bracket means (not illustrated) that are fixed to right and left trailing arms 54 and 56. The foot pads and brake means are basically the same as described in copending application Ser. No. 649,967, filed Jan. 19, 1976 and entitled "Cambering Vehicle" and the disclosure of that copending application is hereby incorporated by reference.

The invention provides new and improved stabilizer and equalizer gearing arrangement for maintaining the steering column 18 at a predetermined rake angle with respect to the supporting surface and to provide for equal and opposite movement of the trailing arms during running operation. Furthermore, this gearing arrangement allows for steering column rake angle adjustment, the folding and locking of the vehicle into a compact package and for the parking of the vehicle on flat and inclined surfaces. Such construction is provided by a special spur gearing arrangement comprising upper spur gear 76 which is secured by a pin 78 to the pivot shaft journal 80 that extends from pivot shaft 50 into journal box 48. As shown, the pivot shaft journal 80 is rotatably supported by bushings that are mounted in aligned openings in right and left side reinforcing plates 82 and 84 welded or otherwise secured to the side walls of the journal box 48 formed by the main frame. Spur gear 76 meshes with a lower spur gear 86 that is secured by radial pin 88 to the journal 90 of the pivot shaft 52 which extends laterally from the left trailing arm into the journal box 48. Journal 90 of pivot shaft 52 is rotatably mounted in left and right bushings which are supported in aligned openings in the reinforcing plates in a manner similar to that described for the journal 80 of the pivot shaft 50.

Figure 6:
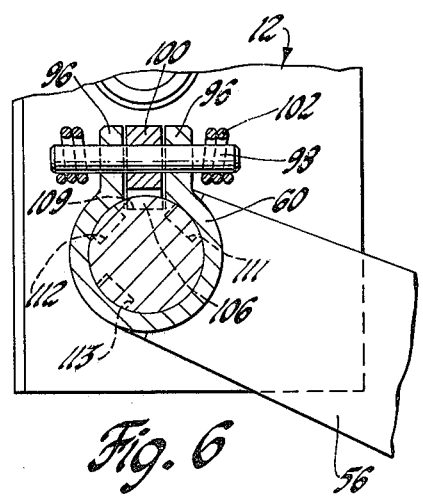
FIG. 6 is a sectional view taken along line 6—6 of FIG. 4.

In the preferred embodiment of the invention, the right side trailing arm 54 has its hub 58 secured by radially extending pin 94 to the pivot shaft 50 so that the arm 54 and the pivot shaft rotate as a unit. The hub 60 of the left side trailing arm 56 is formed with a pair of spaced, upstanding ears 96 through which pivot pin 98 extends. An elongated locking lever 100 extending between the ears 96 is mounted for limited pivotal movement on pin 98. A wire spring 102 having intermediate side portions coiled around the ends of pin 98 and having end portions looped around opposite ends of the lever 100 biases lever 100 in a clockwise direction to drivingly connect the left side trailing arm to the pivot shaft 52. This drive connection is established since the inboard end of lever 100 is formed with a tooth 106 which extends through a slot 108 in the hub and into engagement in a keyway 109 cut into pivot shaft 52. The tooth slot and keyway are dimensioned such that, in the full line position shown in FIG. 4, the trailing arm 56 is fastened to the pivot shaft 52. When these parts are drivingly connected rotation of the trailing arm 56 rotates the pivot shaft 52 and the attached spur gear 86. As shown, the lever 100 has a finger pad 110 on the outboard end thereof which can be manually depressed by the vehicle operator to overcome the force of spring 102 to move the tooth out of engagement with the pivot shaft keyway. Under these conditions, the arm 56 is free to swing on the pivot shaft 52 since the geared drive connection between trailing arms is broken. The main frame and steering column can be pivoted to provide a new rake angle established by the engagement of the tooth 106 with slots or keyways 111 or 112 in pivot shaft 52 shown in FIG. 6. The main frame and steering column can be pivoted to the folded position between the trailing arms as shown in FIG. 3. In the folded position the tooth 106 engages the slot 113 to secure the trailing arm 56 to the pivot shaft.

Figure 5:
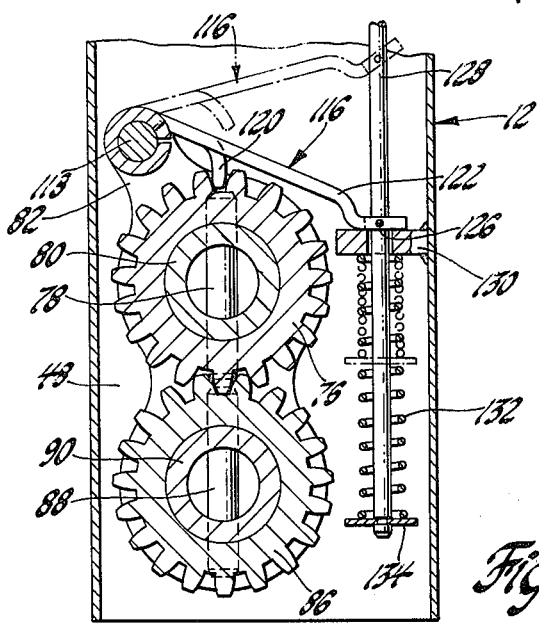
FIG. 5 is a cross-sectional view taken along line 5—5 of FIG. 4.

A special locking mechanism is provided in this invention to maintain the vehicle in folded position or when the vehicle is in an upright position to lock the two trailing arms to each other in any relative angular position. This locking mechanism comprises parking and stowage lock plate 116 pivotally mounted on a pivot pin 118 carried by the reinforcing plates 82 and 84. The lock plate has a depending locking dog 120 that is adapted to enter the tooth spaces of the upper spur gear 76 as best shown in FIG. 5 so that the spur gears are grounded to the main frame and cannot be rotated. The lock plate is also formed with a rearwardly extending leg 122 that is secured by pivot 126 to an elongated actuator rod 128 that extends longitudinally within the main frame 12. As shown in FIG. 5 the lower end of the actuator rod slidably extends through a suitable opening in a support plate 130 and is surrounded by helical spring 132. The lower end of the spring is seated on a retainer 134 suitably secured to the end of the rod. This spring grounded on support plate 130 and engaging retainer 134 biases the rod downwardly to effect the engagement of the locking dog 120 with the teeth of the upper spur gear to prevent rotation of the gears. The upper end of the rod 128 extends through a hooked slot 136 and has a manual knob 138 secured to the outer end thereof. By lifting upwardly on the manual knob the spring 132 is compressed and the locking plate 116 is moved to the phantom line position shown in FIG. 5 to release the gears so that the trailing arms are drivingly interconnected. By moving the end of the rod 128 into the hooked section 140 of slot 138 as shown in FIG. 1 the locking plate 116 is held in the release position.

With the lever 100 drivingly connecting the trailing arm 56 and the pivot shaft 52 and with the locking dog 120 moved from engagement with the spur gear 76, the vehicle is conditioned for normal cambering operation. The vehicle operator can stand on the foot pad and manually grip the handle bars and operate the vehicle in an upright or cambering mode of operation while traversing a course. As pointed out in the copending application 649,967, referenced above, the operation can be either a motorized operation or a manually propelled operation. The trailing arms being interconnected by the spur gearing of this invention move in equal and opposite directions and the steering column is held at a predetermined rake angle. During this operation, compressed spring 132 cannot cause the reengagement of the locking dog since the end of the rod 128 is held in the hooked section 140 of slot 136.

Assuming that the operator desires to park the vehicle on a level or an inclined slope after stopping the vehicle, knob 138 is moved around the hook portion 140 of slot 136 and spring 138 biases the rod downwardly causing the dog to engage the tooth space of the upper spur gear. Under these conditions, the spur gearing is locked so that the arms and main frame are locked together. It will be appreciated that the arms can be locked together in this manner in the same plane for parking on a level surface or locked at any relative angular position for hillside parking.

In the event that the operator desires to pivot the steering column to change its rake angle and with the spur gears released from the locking plate 116, the lever 100 can be depressed to release the geared interconnection between the two arms. When the arms are disconnected, the main frame 12 can be turned on the pivot shafts until one of the slots 111 or 112 is aligned with the tooth 106 of the lever 100. When the selected slot is engaged by the tooth, the new rake angle is established for the column 18.

In addition to rake angle adjustment the finger pad can be manually depressed to release the geared interconnection between the arms and the main frame and the steering column can be moved from the FIG. 1 position to the FIG. 3 position whereby the vehicle is in a compact position for stowage or transportation purposes. In this position, the locking tooth 106 engages in the slot 113 so that the arm 56 is fixed to pivot shaft 52. When in the stowed position the locking dog 120 is engaged with the teeth of the upper spur gear to hold the spur gearing and the trailing arms from turning.

Although the cambering vehicle has been described as having wheels for the three-place contact, skis or ice skates or other contacts may be used with this invention.

While a preferred embodiment of this invention has been shown and described to illustrate operating principles, other embodiments will become more apparent to those skilled in the art. Accordingly, the scope of this invention is set forth in the following claims.

What is claimed is:

1. A cambering vehicle for movement along a support surface comprising a forward main frame, a steering column secured to said main frame disposed at a predetermined rake angle with respect to the support surface, a pair of laterally spaced and elongated trailing arms extending rearwardly from said frame, pivot means pivotally connecting a forward end portion of each of said arms to said main frame thereby supporting said arms for swinging movement on said pivot means, contact means adjacent to the free end portions of each of said trailing arms for engaging the support surface, steerable front contact means operatively supported on said steering column for engaging the supporting surface, manual steering means operatively connected to said steering column, foot support means supported by the rearward ends of each of said trailing arms for receiving the feet of an operator so that the operator can stand erect on the vehicle and manually grip said manual steering means, gear means holding said forward main frame in a predetermined angular position with respect to said support surface and drivingly interconnecting said trailing arms, said gear means incorporating first gear means secured directly to said pivot means for one of said arms and second gear means meshing directly with said first gear means and secured directly to said pivot means for the other of said arms to thereby provide a geared drive connection between said trailing arms so that they swing in equal and opposite directions allowing said vehicle and contact means to be cambered by a standing operator riding said vehicle with all of said contact means remaining in contact with said support surface.

2. A cambering vehicle for movement along a support surface comprising a forward main frame, a steering column secured to said main frame at a predetermined rake angle with respect to the support surface, left and right laterally spaced and elongated trailing arms extending rearwardly from said frame, first and second pivot means axially offset from one another and each secured to a forward end portion of an associated trailing arm and respectively pivotally connecting said forward end portions of said arms to said main frame thereby supporting said arms for up and down swinging movement on said pivot means, contact means adjacent to the free end portions of each of said trailing arms for engaging the support surface, steerable front contact means operatively supported on said steering column for engaging the supporting surface, manual steering means operatively connected to said steering column, foot support means supported by each of said trailing arms adjacent to the free end thereof for receiving the feet of an operator so that the operator can stand in an upright manner on the vehicle and manually grip said manual steering means, gear means holding said forward main frame in a predetermined angular position with respect to said support surface and drivingly interconnecting said trailing arms, said gear means incorporating first gear spur means drivingly secured to said pivot means for one of said arms and second spur gear means directly meshing with said first gear means and drivingly secured to said pivot means for the other of said arms to thereby provide a geared drive connection between said trailing arms so that they swing in equal and opposite directions allowing said vehicle and contact means to be cambered with all of said contact means in contact with said support surface while holding said steering column at said predetermined rake angle.

3. A cambering vehicle for movement along a support surface comprising a main frame, a steering column secured for turning movement on said frame at a first selected rake angle with respect to the support surface, a pair of laterally spaced and elongated trailing arms extending rearwardly from a lower portion of said frame immediately above said support surface, laterally extending pivot means pivotally connecting a forward end portion of each of said arms to said frame thereby supporting said arms for up and down swinging movement, contact means adjacent to the free end portions of each of said trailing arms for engaging the support surface, steerable front contact means operatively supported on a lower end portion of said steering column for engaging the supporting surface, manual steering means operatively connected to an upper end portion of said steering column for turning said steering column and guiding said vehicle, foot pad means on each of said trailing arms and laterally spaced from each other for receiving the feet of an operator so that the operator can stand upright on the trailing arms of said vehicle and manually grip said manual steering means, gear means interconnecting said trailing arms so that they swing in equal and opposite directions as said operator cambers said vehicle, said gear means incorporating first spur gear means secured to one of said arms and second spur gear means secured to the other of said arms and meshing with said first spur gear means to thereby provide a geared drive connection between said trailing arms so that they swing in equal and opposite directions when said vehicle is rolled to either side thereof, first locking means disposed between one of said arms and said pivot means selectively engageable to drivingly connect said first spur gear means and said pivot means so that turning movement of one of said arms in a first direction will effect the equal and opposite turning movement of the other of said arms, said first locking means being disengageable for selectively disconnecting the geared drive connection between said arms so that said frame and steering column can be pivoted toward said trailing arms into a folded position at which position said first locking means is engaged, and second locking means for selectively locking said spur gear drive between said arms to maintain said steering frame, said steering column and said trailing arms in a folded position.

4. A cambering vehicle for movement along a support surface comprising an upright frame, a steering column supported by said frame at a preselected rake angle with respect to said support surface, a pair of laterally spaced and elongated trailing arms extending from a lower portion of said frame, pivot means pivotally connecting a forward end portion of each of said arms to said frame thereby supporting said arms for up and down swinging movement, contact means on the free end portions of each of said trailing arms for engaging the support surface, steerable front contact means operatively supported on said steering column for engaging the supporting surface, manual steering means operatively connected to said steering column, foot pad means on the free end portions of each of said trailing arms for receiving the feet of an operator so that the operator can stand on the vehicle and manually grip said manual steering means, gear means drivingly interconnecting said trailing arms, said gear means incorporating first spur gear means secured to one of said arms and second spur gear means secured to the other of said arms intermeshing with said first spur gear means to thereby provide a geared device connection between said trailing arms so that they swing in equal and opposite directions as the operator cambers the vehicle, manual first locking means operatively connected to said first spur gear means for disengaging said first spur gear means from one of said trailing arms to thereby release the drive connection between said arms so that said frame and steering column can be pivoted toward said trailing arms and subsequently positioned and locked at another selected rake angle with respect to said support surface, and manual second locking means supported by said frame and selectively engageable with said spur gear means for locking said trailing arms from rotation with respect to each other and said frame to hold said vehicle in a predetermined position.

* * * * *